Oct. 14, 1969    A. W. SEGIL ET AL    3,471,981
SUSPENDED CEILING CONSTRUCTION WITH INTERCONNECTED
BAFFLES AND WIREWAYS
Filed June 20, 1966    5 Sheets-Sheet 1
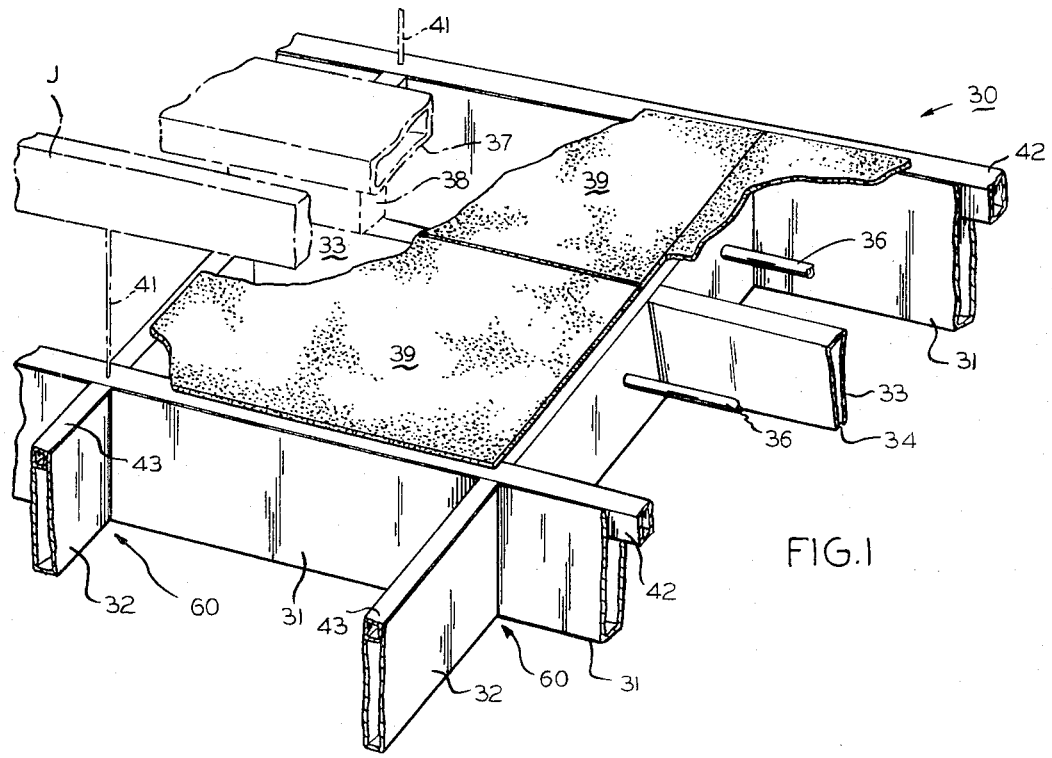
FIG.1
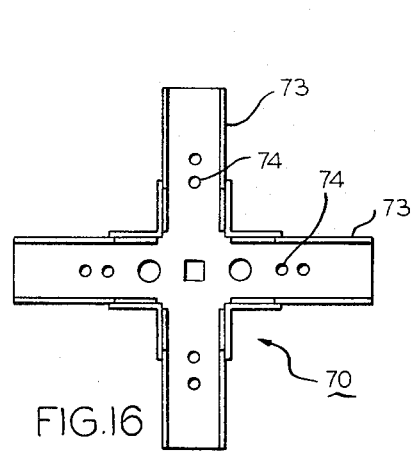
FIG.16
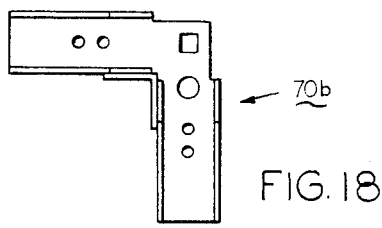
FIG.18
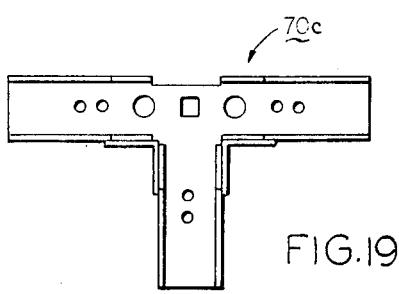
FIG.19
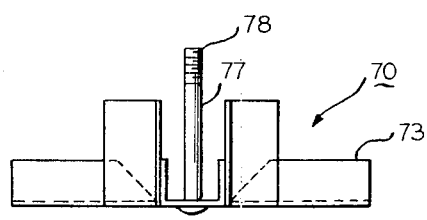
FIG.17
INVENTORS
ARTHUR W. SEGIL
RICHARD N. WHITE
BY
ATTORNEY

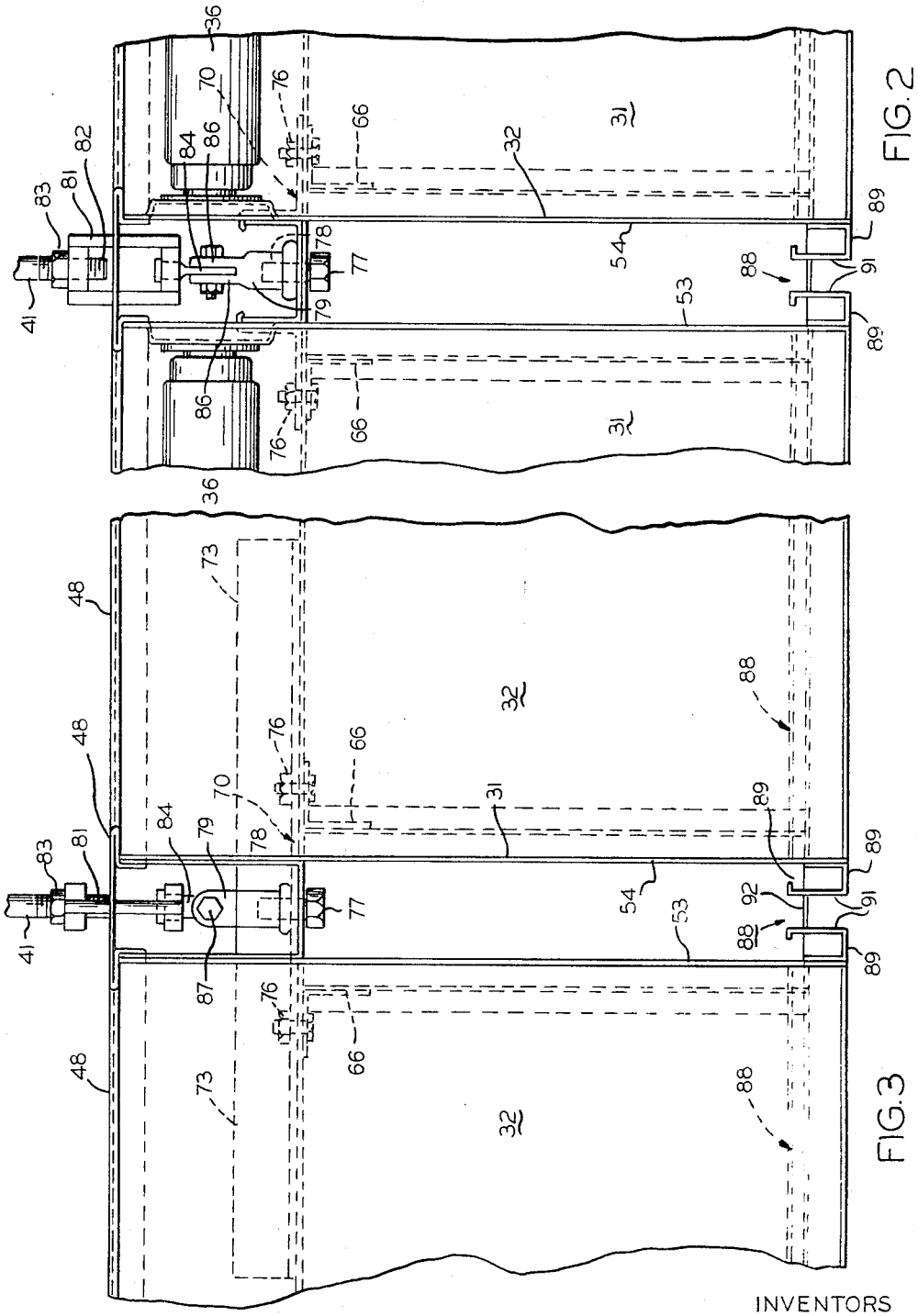

Oct. 14, 1969   A. W. SEGIL ET AL   3,471,981
SUSPENDED CEILING CONSTRUCTION WITH INTERCONNECTED
BAFFLES AND WIREWAYS
Filed June 20, 1966   5 Sheets-Sheet 3
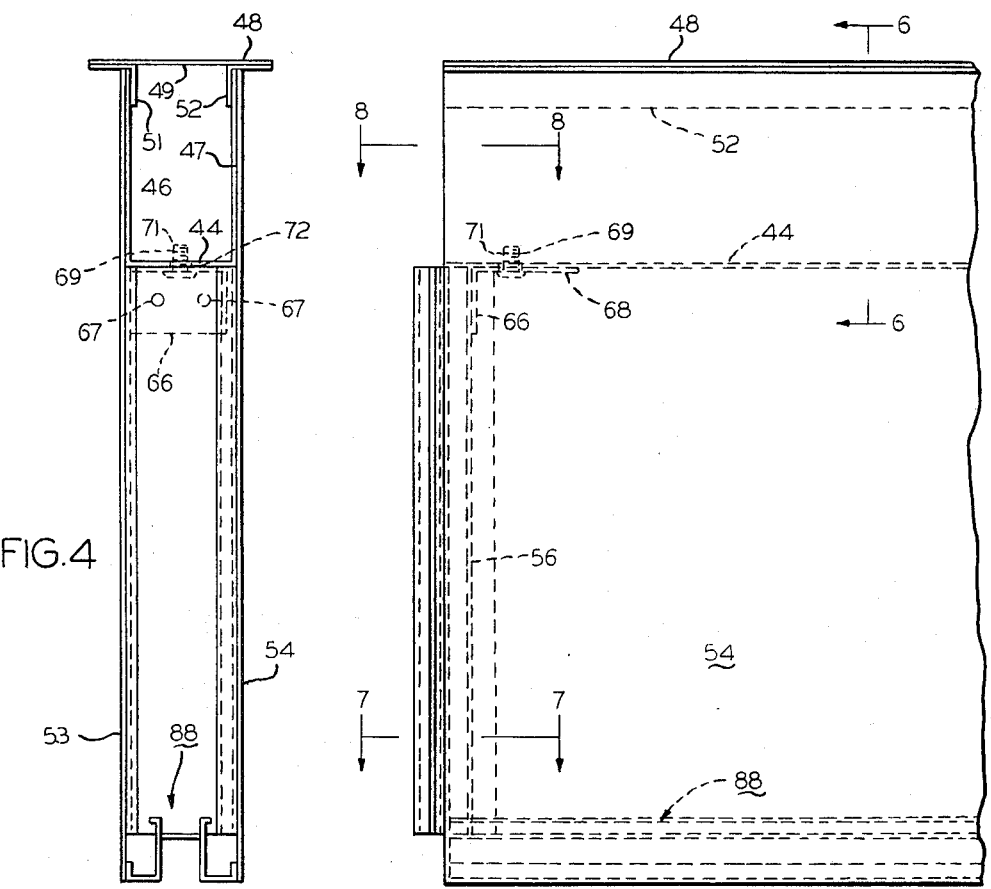
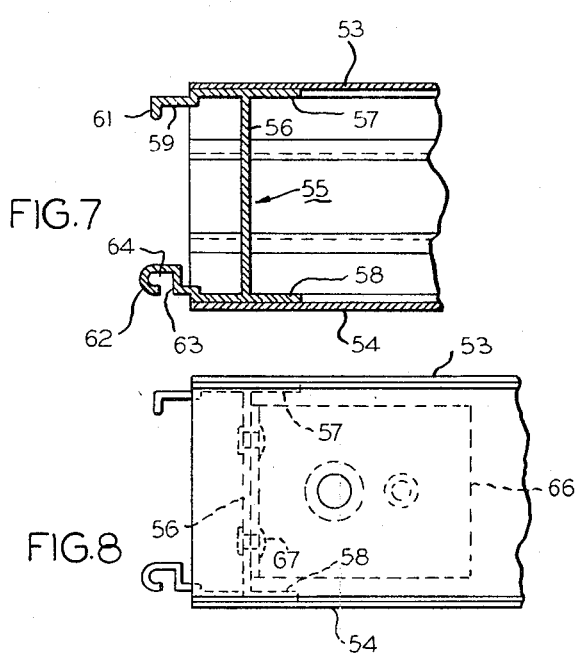
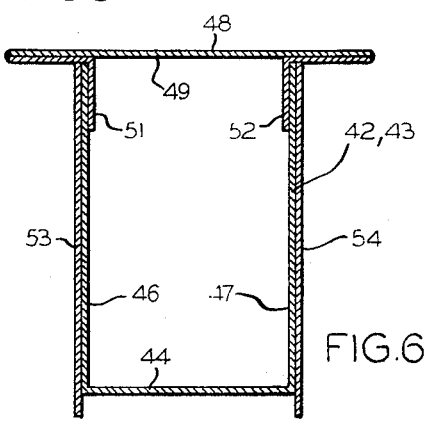
INVENTORS
ARTHUR W. SEGIL
RICHARD N. WHITE
BY
ATTORNEY

INVENTORS
ARTHUR W. SEGIL
RICHARD N. WHITE
BY
ATTORNEY

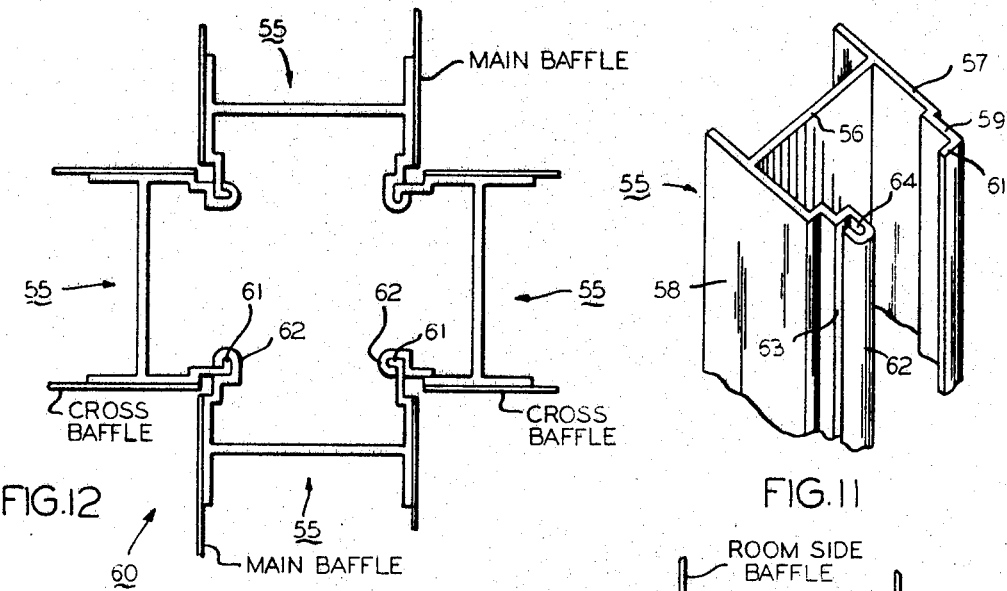
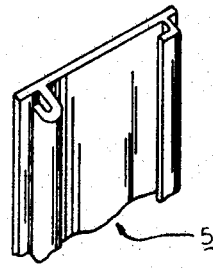
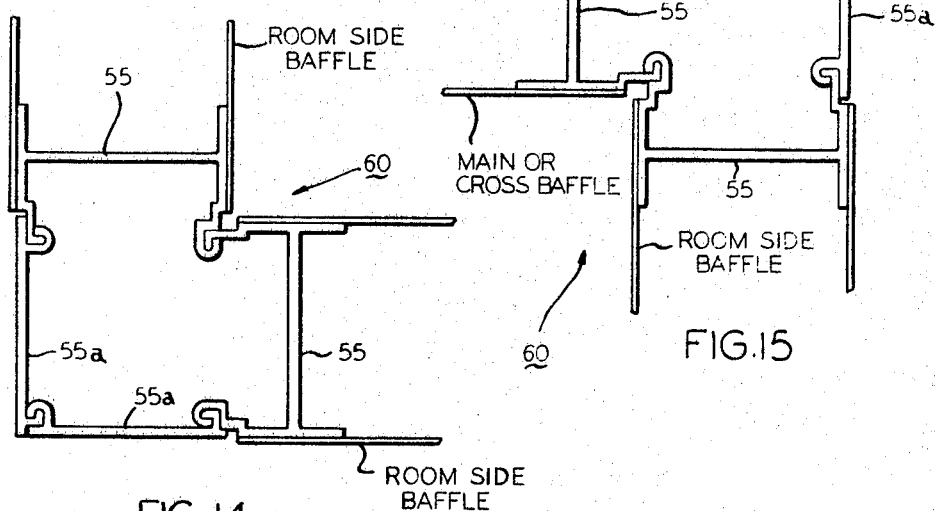

United States Patent Office 3,471,981
Patented Oct. 14, 1969

3,471,981
SUSPENDED CEILING CONSTRUCTION WITH
INTERCONNECTED BAFFLES AND WIREWAYS
Arthur W. Segil, South Highland Park, and Richard N.
White, Des Plaines, Ill., assignors to Luminous Ceilings,
Inc., Chicago, Ill., a corporation of Delaware
Filed June 20, 1966, Ser. No. 558,723
Int. Cl. E04b 5/55
U.S. Cl. 52—220                                    2 Claims

ABSTRACT OF THE DISCLOSURE

In suspended ceiling construction having parallel spaced main baffles perpendicularly connected to spaced parallel cross baffles to form a module, structure for connecting said baffles at the ends thereof to form such module solely by structure integral with each baffle and characterized by the absence of connecting means separate from such baffles, said connecting structure being in the form of a slotted rail at the end of each baffle and having a longitudinal slot provided with its opening disposed to one side of its corresponding baffle, and a locking rail spaced from the slotted rail and extending along an opposite side of its corresponding baffle, the locking rail having an inturned tang for reception within the slotted rail of an adjacent baffle perpendicular thereto.

---

One of the principal objects of the invention is to provide a modular construction for suspended ceiling, each such module being comprised of a pair of parallel and spaced main baffles and a pair of parallel and spaced cross baffles normal to the main baffles and connected therewith, each of such baffles having the ends thereof provided with end members symmetrical about a vertical axis and capable of being brought into locking engagement to provide a corner assembly where the main and cross baffles intersect.

Another object is to provide a corner post assembly for a suspended ceiling construction comprised of parallel main and intersecting parallel cross baffles, where the ends of each of such baffles carry elements capable of interlocking to form such corner post assembly. Such interlocking provides a vertical wireway at module corners for switching and other circuits into a room partition.

Yet another object is to provide elements supported on certain of the baffles and capable of forming a post for a room corner or the side of a room.

Other objects of the invention will be apparent from a study of the specification following taken with the drawings which together describe and illustrate a preferred embodiment of the invention, and what is now considered to be the best mode of practicing the principles of the invention. Other embodiments may be suggested to those having the benefit of the teachings herein, and such other embodiments are intended to be reserved especially as they fall within the purview of the subjoined claims.

In the drawings:

FIG. 1 is an isometric view of a suspended ceiling module according to the present invention, showing how the same is suspended from overhead structural elements;

FIG. 2 is a detailed elevation view showing details of connection of the main baffles to the cross baffles;

FIG. 3 is a detailed elevation view showing details of connection of the cross baffles to the main baffles;

FIG. 4 is an end view of a main baffle, and showing its relationship to a wireway for conducting power to luminaries which may be supported by the cross baffles;

FIG. 5 is an elevation view of one end of the main baffle and the wireway seen in FIG. 4;

FIG. 6 is an enlarged transverse cross-section view taken through the wireways seen in FIGS. 4 and 5 taken along the line 6—6 of FIG. 5 looking in the direction of the arrows;

FIG. 7 is a section taken along the line 7—7 of FIG. 5 looking in the direction of the arrows;

FIG. 8 is a view looking in the direction of the arrows 8—8 of FIG. 5;

FIG. 11 is an isometric view of an end member for the main and cross baffles, said end member being adapted to be connected in interlocking relationship with like end members of contiguous main and cross baffles to provide a corner post;

FIG. 12 is a plan view showing the end members connected in interlocking relationship;

FIG. 13 is an isometric view showing an interlocking member completing closure of a post at the corner of a room or at the side thereof;

FIG. 14 is a view showing post assembly at a room corner;

FIG. 15 is a post assembly at a side of a room;

FIG. 16 is a plan view of a spider arranged to support the cross and main baffles of a ceiling module;

FIG. 17 is an elevation view thereof;

FIG. 18 is a plan view of a spider arranged to support cross and main baffles at a room corner;

FIG. 19 is a plan view of a spider arranged to support cross and main baffles at a side of a room.

Figure 10:
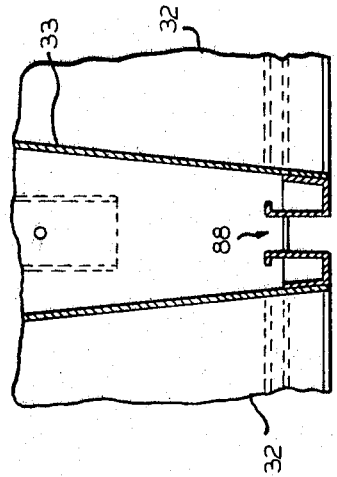
FIG. 10 is a cross sectional view through an intermediate baffle adapted to be supported by the cross baffles of FIG. 1 in lieu of a ventilating baffle as desired.

Referring now particularly to FIG. 1 of the drawings, a suspended ceiling construction having the improvements according to the present invention is referred to generally by the reference numeral 30. A typical module is shown in FIG. 1 and is comprised of laterally spaced main baffles 31 which are joined to laterally spaced cross baffles 32 extending at right angles to the main baffles 31. The cross baffles 32 in turn support intermediate baffles 33, which in the case here are of the ventilating type having an opening 34 in the lower extremities thereof to introduce conditioned air to an enclosure below the suspended ceiling 30. The cross baffles 32 support luminaries 36 in the form of fluorescent tubes spanning the distance between the cross baffles 32.

The intermediate or ventilating baffle 33 is supplied with conditioned air by means of a supply plenum 37 having ducts 38 connected to the baffle 33.

Each of the ceiling modules is surmounted by acoustic and light reflecting panels 39 which rest at their ends on the cross baffles 32, and along their sides on the main baffles 31 and the intermediate baffles 33.

The ceiling module seen in FIG. 1 is suspended from an overhead framing structure such as a joist J by hangers 41 secured at their lower ends at the juincture of the main baffle 31 to the cross baffle 32.

The main baffles 31 and the cross baffles 32 are assembled to respective main wireways 42 and cross wireways 43, see FIGS. 2 to 6 inclusive. These are identical in cross section, and are in the form of a U-shaped channelway with a bottom web 44 having upstanding sides 46 and 47. The opening defined by the vertical sides 46 and 47 is closed by a closure 48 formed from flat stock and bent in the manner shown to provide a top closure plate 49 having spaced depending flanges 51 and 52 therefrom adapted to nest within the upstanding sides 46 and 47 with a good sliding fit.

The main baffles 31 and the cross baffles 32 are constructed identically, and each is comprised of spaced side panels 53 and 54 and maintained in proper spaced relationship by interlocking end members indicated generally by the reference numeral 55 and seen in FIG. 11. An end member 55 is provided at each end of the baffle members 31 and 32. Each such end member 55 is formed from an extrusion of light metal such as aluminum, and consists of a spacing web 56 extending between opposed flanges 57 and 58. The side panels 53 and 54 are glued respectively to the flanges 57 and 58, preferably by a suitable epoxy or polyester type cement. Such cement enables the sides to be completely smooth throughout their total expanse, unmarred by rivets or other fastening devices.

The end members 55 are adapted to be interlocked to provide a corner post 60, which is only partly visible, where the cross and main baffles intersect, the mode of joining the baffles at their ends being thus entirely concealed. Such interlocking of the end members 55 is done symmetrically about a vertical axis defined by the intersection of the substantial longitudinal plane extending through each baffle, be it a cross baffle or a main baffle. By such construction of the baffles they can be reversed end for end and interlocking readily carried on As seen particularly in FIGS. 7, 8 and 11 to 15, each of the members 55 has the flange 57 thereof extended beyond the end of side 53 on a flange extension 59 terminating in an inturned tang 61. Flange 58 is extended beyond the end of side 54 in a slotted rail 62 having an opening 63 to a guideway 64. The opening 64 is adapted to receive flange extension 59 while the guideway 64 is adapted to receive the inturned tang 61.

The interlocking of the members 55 is best seen with reference to FIG. 12, which shows the end members 55 interlocked at the intersection of the main and cross baffles. Thus, the hooked rail 62 of a main baffle 31 is interlocked with a tang 61 of a cross baffle 32, and the hooked rail 62 of a cross baffle 32 is interlocked with a tang 61 of a main baffle 31.

Referring now to FIGS. 13 and 14, additional baffles be they the type extending parallel with the main baffles 31, or parallel with the cross baffles 32 are arranged to complete the suspended ceiling construction at room corners, for example. In such cases, the interlocking is completed by auxiliarly members 55a seen in FIGS. 13 and 14. At such room corner the baffles are termed room side baffles.

Referring to FIG. 15, the baffles are arranged to complete the suspended ceiling at the side of a room. In such cases, but one of the auxiliary members 55a is required to complete a corner post assembly 60.

Structure is provided for holding the main and cross baffles 31 and 32 to their respective wire ways 42 and 43 while being suspended by the hangers 41. To this end, the webs 56 of the end members 55 have L-shaped securing brackets 66 riveted thereto as at 67. Bracket 66 has an horizontal leg 68 and a securing bolt 69 welded thereto, threaded shank 71 thereof extending upward through an aperture 72 in the web 44 of the wireways 42, 43.

A support spider 70, see FIGS. 16 and 17, has horizontal arms 73 extending in directions corresponding to the main and cross baffles 31 and 32, and each arm has an aperture 74 which is aligned with the bolt 69. Arms 73 extend within the wireways 42, 43 and over the webs 44 thereof, the assembly beng held together by securing nuts 76, see FIGS. 2 and 3.

The support spider 70 has a bolt 77 staked thereto at the intersection of the arms 73. Bolt 77 has its threaded shank 78 extending upward in threaded engagement with a clevis 79. An adjustable hanger member 81 is threaded at 82 to the lower end of the hanger 41 and is locked in position by a locking nut 83. Hanger member 81 has a depending tongue 84 engaged between spaced arms 86 of clevis 79, and a bolt 87 holds tongue 84 to clevis 79.

It should be noted that assembly of the main and cross baffles in the manner just described is done after the end members 55 of the baffles are brought into interlocking relationship as shown in FIG. 12. During such assembly the cover members 48 are removed, so that the bolting up operations described can be done readily.

Referring now to FIGS. 18 and 19 there are shown support spiders 70b and 70c respectively. Support spider 70b is employed with the baffles at a room corner with the corner post assembly seen in FIG. 14. Support spider 70c is employed with the baffles at a room side seen in FIG. 15.

The bottom extremities of the baffles 31 and 32, see FIGS. 2 and 3, are closed by a longitudinally extending bottom closure extrusion 88 having vertical sides 89 engaged with the inner sides of the side panels 53 and 54 of the baffles 31 and 32. Extrusion 88 has bottom web portions 89 coterminous with the bottom edges of the side panels 53 and 54, spaced vertical legs 91 and a closing web 92 spaced above the web portions 89. The end members 55 are relieved to accommodate the vertical legs 91 of the bottom closure extrusion 88.

Figure 20:
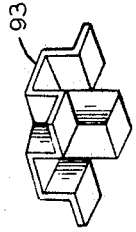
FIG. 20 is a closure for the bottom of a corner post as seen in FIG. 12.

Referring now to FIG. 20 there is shown a corner post lower end cap 93, which nests within the bottom closure extrusion 88 seen in FIGS. 2 and 3 and is held thereto by a screw, not shown.

The baffles 31 and 32 may have a core of light weight material such as hexagon cell honeycomb to give the side panels 53 and 54 stiffness and provide sound insulation.

Figure 9:
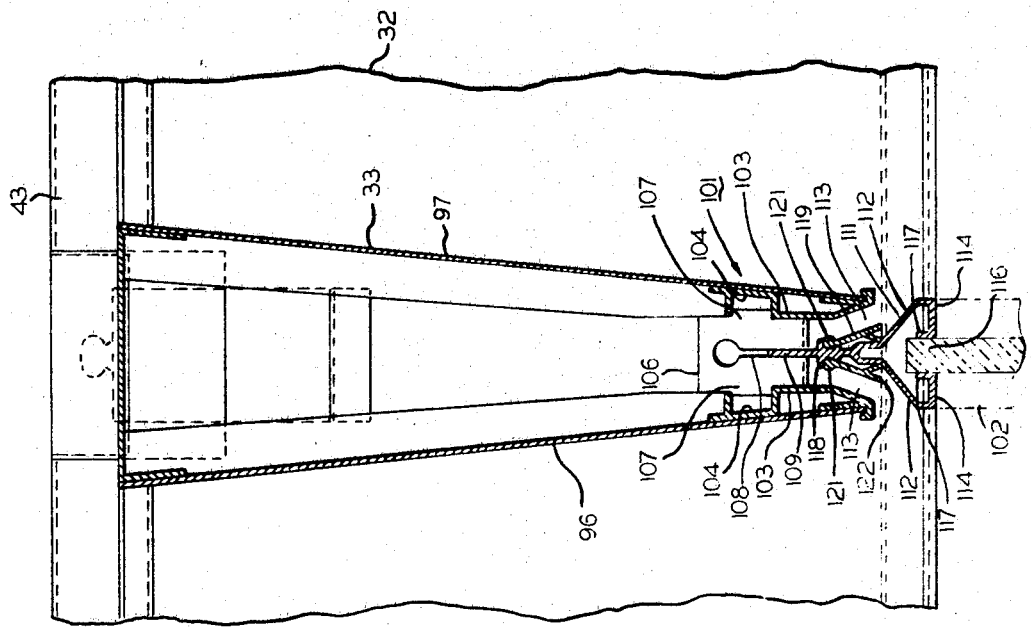
FIG. 9 is a cross sectional view through a ventilating baffle adapted to be supported by the cross baffles seen in FIG. 1.

Referring now to FIGS. 9 and 10, there is shown the ventilating baffle 33 which is supported at its ends to the cross baffles 32. The mode of connection of such ventilating baffle to the cross baffle 32 is shown in the patent of Smith and Thompson, Patent No. 3,359,697, for Suspended Ceilings issued Dec. 26, 1967. The mode of connection is the same for an intermediate baffle 33 shown in FIG. 10, which differs from the ventilating baffle in that it is not provided with openings in the bottom extremities to deliver conditioned air to the room space below the ceiling.

As seen in FIG. 9 the ventilating baffle has spaced sloping sides 96, and bottom extremities thereof joined by a lower closure assembly 101 extending lengthwise thereof. In certain cases the placement of the ventilating baffle 33 may coincide with a partition divider of the room enclosures, and the ventilating baffle is operable to supply conditioned air to both sides of such partition divider. As seen in FIG. 9, the ventilating baffle 33 surmounts a partition 102 shown in phantom outline.

Closure assembly 101 includes a pair of extrusions 103 flanking the inside faces of the sloping sides 96 and 97 and are cemented thereto by a suitable epoxy or polyester resin. Each extrusion has a channel 104 in confronting relationhip with the opposite channel 104. Cross web members 106 are spaced throughout the length of the extrusions 103 and are provided with ears 107 which are pressed into the channels to provide a rigid structure. The cross web members 107 are each provided with a slot 108 to receive a long web 109 of a diverter baffle extrusion 111. Said diverter baffle extrusion 111 has wing-like extensions 112 which are spaced from the extrusions 103 to provide passageways 113 extending for the length of the baffle 33.

The wing-like extensions 112 have bases 114 adapted to rest upon the partition 102. These bases are separated by a slot 116 extending the length of the extrusion 109. Slot 116 is flanked by inturned flanges 117 adapted to embrace a glass pane of a glass partition therebetween in lieu of there being the partition 102.

The extrusion 109 is made with longitudinally extending hinge pockets 118 embracing greater than 180° of central angle, and each pocket is adapted to receive a vane 119 extending longitudinally of such pocket 118, the vane 119 having a central hub 121 engaged in the hinge pocket 118. The ends of the vanes 119 are bifurcated as at 122, and the vanes can be rocked selectively to close against the extrusion 103, and thus block passageways 113, or against extrusion 111 to leave passageway 113 open.

Thus ventilating baffle 33 can be arranged to supply conditioned air to either or both sides of the partition 102, and both passageways 113 may be blocked if the baffle is not to supply the conditioning air.

From the description foregoing it is believed evident that there has been provided some new and useful improvements in the art relating to suspended ceiling construction. The structure disclosed is stably suspended from overhead framing, and is characterized by modular members which can be readily assembled and disassembled, and which assembled effectively conceals the mode of assembly.

We claim:
1. A suspended ceiling construction having parallel spaced main baffles perpendicularly connected to spaced parallel cross baffles, said main baffles and cross baffles each comprising spaced side panels connected by end members, each end member comprising a spacing web extending between opposed flanges, each of said flanges being secured to the inner surface of a respective side panel, one of said flanges having a flange extension extending beyond the end of its respective side panel, and terminating in an inturned tang, the remaining flange extending beyond its respective side panel terminating in a slotted rail, said slotted rail providing a guideway and an opening directed laterally outwardly of said baffle, the opening of the slotted rail having a width equal to the thickness of said flange extension and said guideway being of a size to closely receive said tang, the tang of a baffle being received in the slotted rail of a baffle extending perpendicularly thereto.

2. In structure according to claim 1 wherein wireways are arranged coextensive with said main and cross baffles, and above the same and wherein the spaced side walls of said baffles embrace said wireways to conceal the same.

References Cited

UNITED STATES PATENTS

| 1,742,947 | 1/1930 | Brash | 61—60 |
| 2,698,071 | 12/1954 | Lee | 52—484 |
| 2,884,512 | 4/1959 | Wakefield | 240—9 |
| 3,203,150 | 8/1965 | Serneblad | 52—664 |
| 3,210,534 | 10/1965 | Kump | 240—9 |

FOREIGN PATENTS

| 47,434 | 1/1937 | France. |
| 848,244 | 9/1952 | Germany. |
| 925,793 | 3/1955 | Germany. |
| 308,268 | 4/1930 | Great Britain. |

ALFRED C. PERHAM, Primary Examiner

U.S. Cl. X.R.

52—484; 240—9, 28, 664